Aug. 20, 1929.  G. C. TAYLOR  1,724,979
HYDRAULIC REGULATING APPARATUS
Filed July 30, 1925
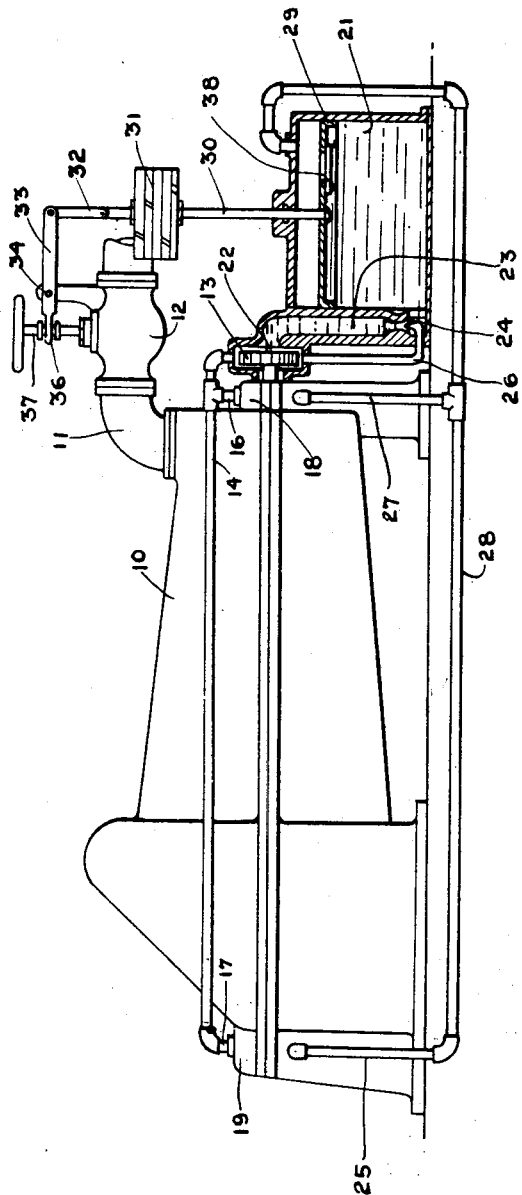
WITNESSES:
R.B.Wakefield
G.C.Taylor
INVENTOR
BY F.C.Davis
ATTORNEY Patented Aug. 20, 1929.

1,724,979

UNITED STATES PATENT OFFICE.

GEORGE C. TAYLOR, OF PHILADELPHIA, PENNSYLVANIA, ASSIGNOR TO WESTINGHOUSE ELECTRIC & MANUFACTURING COMPANY, A CORPORATION OF PENNSYLVANIA.

HYDRAULIC REGULATING APPARATUS.

Application filed July 30, 1925. Serial No. 47,029.

My invention relates to fluid pressure systems, more particularly to fluid pressure systems such as are employed for conveying lubricating fluid to the bearings of prime movers and for other purposes associated therewith and has for its object the provision of simple, efficient apparatus for supplying the system with an initial quantity of fluid under pressure when the prime mover is being started after standing idle.

Apparatus embodying features of my invention is illustrated in the accompanying drawing in which the single figure is a view, partially in section, showing an elastic fluid turbine having my improved apparatus applied thereto.

In the operation of prime movers, especially elastic fluid turbines, it is highly important that a supply of lubricant be furnished the bearings as soon as the turbine is started. Where the lubricating system is supplied from a pump driven directly from the turbine shaft, it has been found necessary to provide a separate auxiliary pump which is started in advance of the turbine. This pump supplies fluid to the turbine bearings at the time the turbine is being started and until the pump driven by the turbine is supplying a sufficient quantity of fluid under pressure.

In accordance with my invention I provide a means for developing a pressure upon the fluid reservoir from which the pump supply is taken at the time the turbine is being started and a quantity of the fluid within the reservoir is forced outwardly thereof through the pump and into the fluid pressure system before the pump itself is started or begins to develop pressure. In order to develop the pressure of fluid within the reservoir I provide a weighted piston which is brought to bear thereon upon starting the turbine or upon opening of the turbine throttle valve.

Referring now to the drawing for a better understanding of my invention I show at 10 an elastic fluid turbine having an admission conduit 11 and a throttle valve 12. Driven directly by the turbine 10 is a pump 13 which is employed to develop fluid under pressure for the fluid pressure system associated with the turbine. Fluid pressure developed by the pump 13 is discharged into a conduit 14 from which depend conduits 16 and 17 leading to turbine bearings 18 and 19. Fluid for the pump 13 is supplied from a fluid reservoir 21 to the pump intake, shown at 22, through a conduit 23. In order to insure a supply of fluid under positive pressure at the pump intake 22 when the pump is in operation, I provide an ejector 24 which is operated by fluid pressure developed by the pump and delivered through a conduit 26 leading from the discharge side of the pump to the ejector 24.

After passing through the bearings 18 and 19, fluid drains away therefrom through conduits 25 and 27 to a conduit 28 and from thence into the fluid reservoir 21. Located within the reservoir 21 is a piston 29 having a stem 30 extending upwardly and outwardly thereof. Surrounding the stem 30 is a weight 31, adapted when released, to force the piston 29 downwardly onto the oil within the reservoir 21, imposing a pressure thereon. The stem 30 is connected through a link 32 with a lever 33. The lever 33 is fulcrumed at 34 and is connected at 36 to a throttle valve stem 37. Upon opening the throttle valve 12, the stem 37 is raised, allowing the outer end of the lever 33 to be lowered, whereupon the weight 31 is free to act upon the piston 29. Upon closing the throttle valve 12 the stem 37 is lowered and the outer end of the lever 33 raised together with the piston 29, relieving pressure from the fluid within the reservoir 21. Embodied in the piston 29 is a check valve 38 which permits fluid entering the reservoir to pass inwardly thereof freely by the piston 29. Upon lowering the piston 29, however, the check valve 38 closes and no fluid can pass outwardly of the reservoir through said check valve.

From the foregoing description of my invention, its operation will be apparent. Assume that the turbine 10 is shut down and that the piston 29 and weight 31 are in their uppermost positions. Upon starting the turbine the throttle valve 12 is opened, raising the stem 37, whereupon the weight 31 and piston 29 move downwardly. Downward movement of the piston 29 imposes a pressure upon the fluid within the reservoir 21 and forces a part of the fluid from said reservoir through conduits 23 and 26 into the pump 13 and outwardly thereof through conduit 14 to the fluid pressure system. As soon as the turbine is started, the pump 13 begins to develop pressure for the supply of the system. Fluid within the system passes from the discharge conduit 14 through the bearings 18 and 19 back into the conduit 28 to the fluid reservoir 21 and through the check valve 38 to the space beneath the piston 29.

From the foregoing it will be apparent that I have provided a simple, effective auxiliary fluid supply means for a prime mover having a fluid pressure system associated therewith.

While I have shown my invention in but one form, it will be obvious to those skilled in the art that it is not so limited, but is susceptible of various changes and modifications, without departing from the spirit thereof and I desire, therefore, that only such limitations shall be placed thereupon as are imposed by the prior art or as are specifically set forth in the appended claims.

What I claim is:

1. The combination of a prime mover having a fluid pressure system associated therewith, a pump for providing fluid pressure for the system, starting means for the prime mover, and means made effective by operating the starting means for priming the pump, said priming means being effective only during operation of the starting means.

2. The combination of a prime mover having a fluid pressure system associated therewith, a pump for providing fluid pressure for the system, a throttle valve, and means made effective by opening the throttle valve for priming the pump and furnishing an initial supply of fluid to the fluid pressure system, said priming means being effective only during opening of the throttle valve.

3. The combination with a prime mover having a fluid pressure system associated therewith, a pump for providing fluid pressure for the system, and a throttle valve, of a fluid reservoir, conduit means leading from the fluid reservoir to the pump, and means made effective upon opening the throttle valve for imposing a pressure upon the fluid in the reservoir whereby it is forced through the conduit means to the pump, said means being effective only during opening of the throttle valve.

4. The combination with a prime mover having a fluid pressure system associated therewith, a pump for providing fluid pressure for the system, and a throttle valve, of a fluid reservoir for supplying the pump, conduit means leading from the fluid reservoir to the pump, a weighted piston within the fluid reservoir, and means operated by opening the throttle valve for imposing the weighted piston upon the fluid therebeneath and forcing a part of said fluid through the conduit into the pump and the fluid pressure system.

5. The combination with a prime mover having a fluid pressure system associated therewith, a pump for providing fluid pressure for the system, and a throttle valve, of a fluid reservoir for supplying the pump, conduit means leading from the fluid reservoir to the pump, a weighted piston associated with the fluid reservoir and adapted to impose a pressure on the fluid therein, and an operative connection between the throttle valve and the piston whereby, upon opening the throttle valve, the weighted piston is imposed upon the fluid therebeneath and fluid is forced into the pump.

6. The combination with a prime mover having a fluid pressure system associated therewith, a pump for providing fluid pressure for the system, and a throttle valve, of a fluid reservoir for supplying the pump, conduit means leading from the fluid reservoir to the pump, a weighted piston associated with the fluid reservoir and adapted to impose a pressure on the fluid therein, and an operative connection between the throttle valve and the piston, whereby upon opening the throttle valve, the weighted piston is imposed upon the fluid therebeneath and fluid is forced into the pump, and means permitting a free passage of fluid through said piston into the reservoir when the throttle is open.

7. The combination with a prime mover having a fluid pressure system associated therewith, a pump for providing fluid pressure for the system, and a throttle valve, of a fluid reservoir for supplying the pump, conduit means leading from the fluid reservoir to the pump, a discharge conduit leading from the pump to the fluid pressure system, a drain conduit in the fluid pressure system leading to the fluid reservoir, a weighted piston associated with the fluid reservoir, an operative connection between the throttle valve and the piston whereby, upon closing the throttle valve, the piston is moved outwardly of the reservoir and upon opening the throttle valve the piston is moved inwardly of the reservoir, imposing a pressure on the fluid therein, and means permitting a free passage of fluid from the drain conduit through said piston inwardly to the reservoir when the throttle is open.

8. The combination with a prime mover having a fluid pressure system associated therewith, a pump for providing fluid pressure for the system, and a throttle valve, of a fluid reservoir for supplying the pump, conduit means leading from the reservoir to the pump, a piston within the reservoir, means for operating said throttle valve, and means controlled by said throttle valve operating means for operating said piston upon opening the throttle valve, said piston being effective, when thus operated by said means, to force fluid from said reservoir through the conduit means and to the pump.

9. The combination with a prime mover having a fluid pressure system associated therewith, a pump for providing fluid pressure for the system, and a throttle valve, of a fluid reservoir for supplying the pump, conduit means leading from the reservoir to the pump, a piston within the reservoir, said piston being effective, upon movement in one direction, to force fluid from said reservoir through the conduit means and to the pump, means for operating the throttle valve, and means controlled by the throttle valve operating means for moving said piston in said one direction upon opening the throttle valve.

10. The combination with a prime mover having a fluid pressure system associated therewith, a pump providing fluid pressure for the system and a throttle valve, of means for operating the throttle valve, a fluid reservoir for supplying the pump, means for translating fluid from the reservoir to the pump during operation of the pump, and auxiliary means for translating fluid from the reservoir to the pump, said auxiliary means being controlled by the throttle valve operating means and being effective to translate fluid from the reservoir to the pump upon opening of the throttle valve.

In testimony whereof, I have hereunto subscribed my name this twentieth day of July 1925.

GEORGE C. TAYLOR.